April 18, 1967

S. C. RETHORST 3,314,629

SHOCKLESS SUPERSONIC AIRCRAFT

Filed Dec. 7, 1964

Irrotational Flow $$\frac{\partial v}{\partial z} = -\frac{v}{R} < 0$$

$$M < 1$$

Rotational Flow $$\frac{\partial v}{\partial z} > 0$$

$$M > 1$$

INVENTOR:
Scott C. Rethorst

By Smyth, Roston & Pavitt
Attorneys

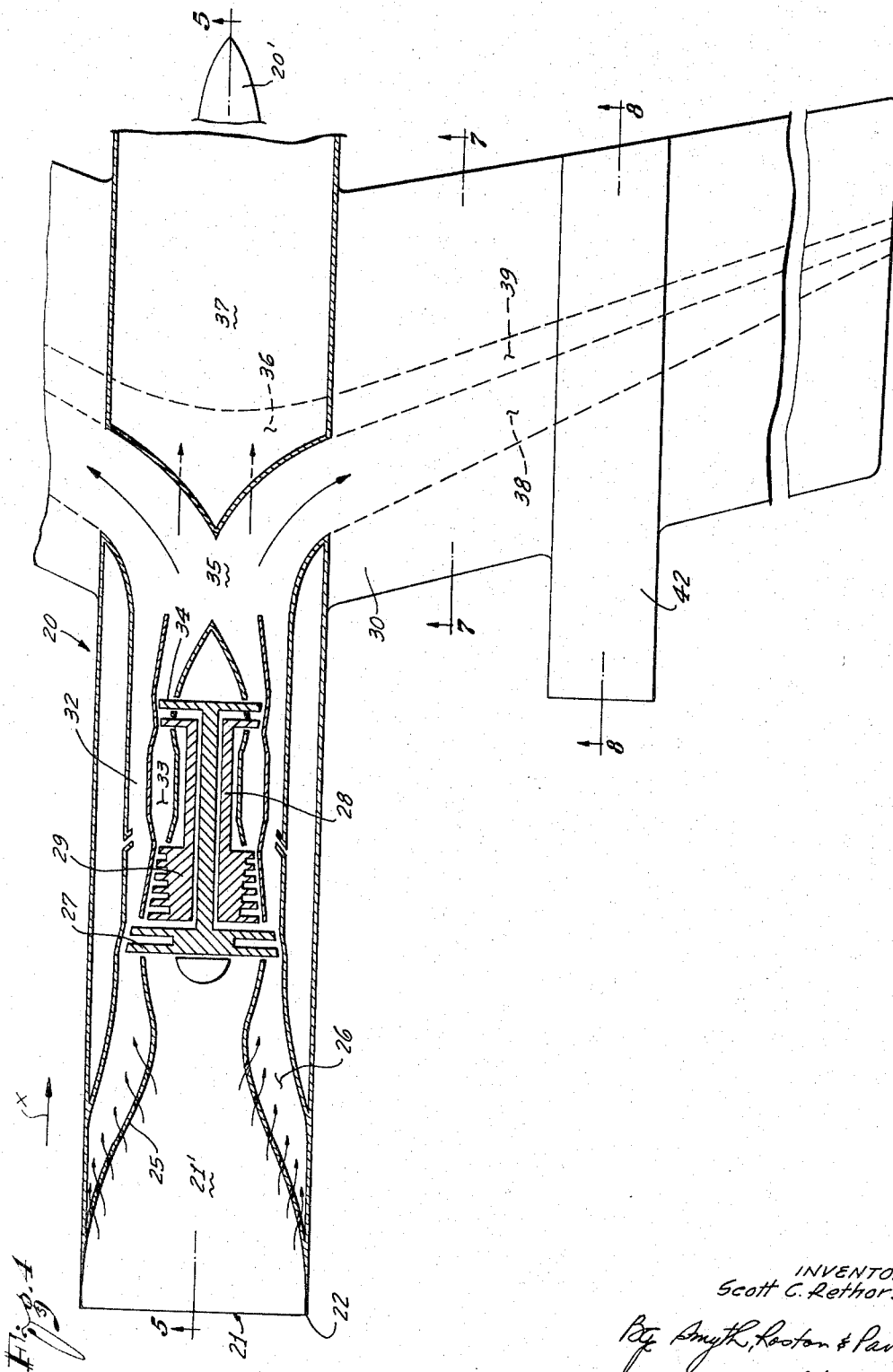

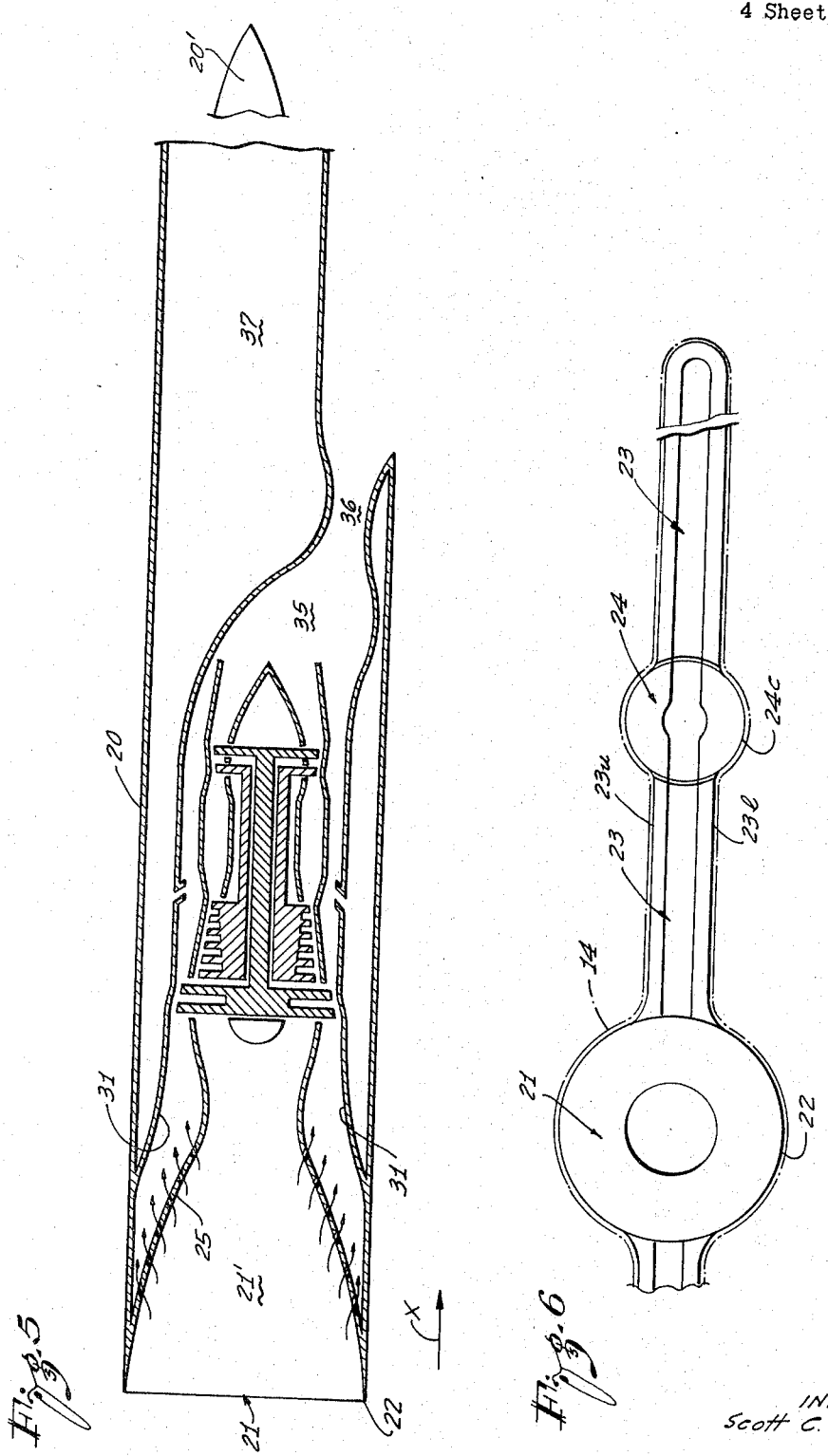

April 18, 1967  S. C. RETHORST  3,314,629
SHOCKLESS SUPERSONIC AIRCRAFT
Filed Dec. 7, 1964  4 Sheets-Sheet 4

INVENTOR:
Scott C. Rethorst

By Smyth, Roston & Pavitt
Attorneys

United States Patent Office 3,314,629
Patented Apr. 18, 1967

3,314,629
SHOCKLESS SUPERSONIC AIRCRAFT
Scott C. Rethorst, 1661 Lombardy Road,
Pasadena, Calif. 91106
Filed Dec. 7, 1964, Ser. No. 416,281
23 Claims. (Cl. 244—35)

This invention is related to provisions of an aircraft geometry and structure enabling the aircraft to fly at supersonic speeds at a greatly minimized development of adverse, compressive shock wave patterns which dissipate energy and generate sonic booms which extend to the surface of the earth causing damage to property and people on the ground, thereby restricting operation of such aircraft.

The invention in particular provides a unique combination of geometry and air flow control to permit the air to flow by the fuselage, wing, and any other structure of a supersonic aircraft in such a manner as to permit the air to pass the obstacle providing lift but without the generation of dissipative shock waves.

It is well recognized that an urgent requirement exists for a solution to the problems of efficiency in supersonic flight and the sonic boom. These problems are so severe as to make the entire commercial supersonic program marginal.

From an efficiency standpoint, the degradation of energy through dissipative shock mechanisms reduces the lift/drag ratio (L/D) of supersonic aircraft to the order of seven, as compared with values in excess of twenty for subsonic aircraft. The operating cost and productivity of such supersonic aircraft generating dissipative shocks is therefore marginal, and poses a severe limitation on supersonic operation.

The basic flow problem in aeronautics in the normal case of uniform flow is for the fluid (air) to increase its mass flow in the smaller flow tube cross section imposed by an obstacle such as a wing or body so as to permit the fluid to pass. Since the conditions far from the obstacle must remain those of the free stream, any flow adjustment must take place primarily in the neighborhood of the body. However, the maximum mass flow per unit area of a gas stream of a given Bernoulli constant occurs when that gas has the velocity of sound. At lower speeds, the density is greater, but not enough to compensate for the smaller velocity. At higher speeds, the density falls off more rapidly than the velocity increases, and the product is again smaller. Thus the problem becomes one of determining both subsonic and supersonic flow mechanisms compatible with the basic laws of fluid dynamics which, together with suitable boundary conditions, will permit the fluid to pass the obstacle with minimum energy loss yet providing the required lift.

At subsonic speeds the uniform flow mechanism is compatible with the external boundary conditions of the familiar streamlined shapes of conventional aircraft, and consequently the flow passes the obstacle with no energy dissipation. At supersonic speeds the uniform flow mechanism is not compatible with simple external boundary conditions, and the flow requires either the familiar dissipative shock mechanism or some further non-uniform flow provision to enable passage of the obstacle. The present invention is concerned with such additional flow mechanisms to enable the flow to pass an obstacle at supersonic speeds without dissipative shocks.

The principle behind the invention is the consideration that an aircraft body component such as wing, tail fuselage, wing engine, etc., on one hand, has a cross-sectional profile which in its largest dimensions appears to the air stream as an obstacle. The air which in the undisturbed flow field would flow through this obstacle area must be accommodated. On the other hand, if the front portion of such a component is designed to have an opening that has comparably large dimensions, such air, which otherwise would flow through the "obstacle area" will enter the opening and will not have to be displaced exteriorally from the obstacle. The velocity profile of this air entering the craft through the front opening thereof is now susceptible to control action exclusively in the interior of the craft, and any increased mass flow around the exterior of the aircraft is avoided. Since the problems involved, the background for the solution of such problems, and the solution itself is best understood with the aid of illustrations, reference is made to the appended drawings, in which:

FIGURE 4 illustrates somewhat schematically a plan view of a supersonic aircraft embodying the features herein described to provide irrotational flow and hence obviate dissipative shock waves;

FIGURE 5 illustrates somewhat schematically a sectional view of the aircraft of FIGURE 4 taken along the line 5—5 of the fuselage thereof;

FIGURE 6 illustrates a front view of a portion of the aircraft of FIGURE 4;

Figure 1:
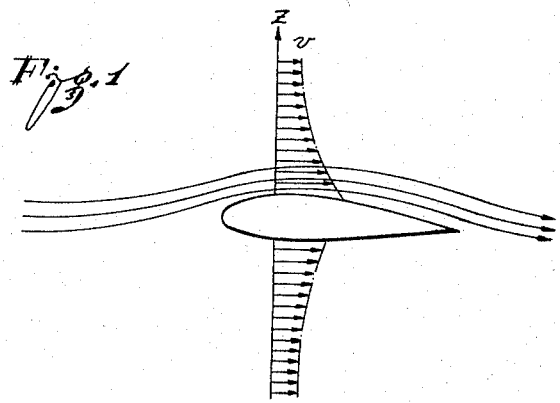
FIGURE 1 is a velocity profile of Irrotational Flow, showing the speed up of the air in the neighborhood of a body, yet adjusting to the velocity of the basic stream at a great distance from the body.

When a stream approaches a solid obstacle at a subsonic speed, the reduction of the stream area imposed by the presence of the obstacle necessitates a speeding up of the fluid external to the obstacle to allow and increased mass flow per unit area through the remaining passage. As conditions at a great distance $z$ to either side of the body remain those of the basic stream, the increase of velocity $v$ must occur chiefly in proximity to the body. (See FIGURE 1).

There is then a negative velocity gradilent as one proceeds outward along a normal to the surface. Such a gradient fits the requirement of zero vorticity in the flow about a convex surface, and a flow satisfying this requirement is therefore possible. Let $R$ be the radius of the convex surface of the obstacle, then the relation must be $$\frac{\partial v}{\partial z} = -\frac{v}{R} < 0$$

for irrotational flow. Of course, this condition is true only in the flow region beyond the viscous boundary layer near the surface, since the velocity gradient is always positive in this boundary layer.

The ideal theory then postulates that this flow not only can, but must, establish itself in an isentropic set-up. Such a flow without vorticity has a velocity potential, and is therefore called a Potential Flow. The possibility that conditions might not be isentropic is ruled out in subsonic flow because there is no way (except by external heating or cooling) in which changes of entropy can be produced without shocks—and shocks can only occur at supersonic speeds. It is clear that a shockless, constant entropy flow involves no expenditure of energy—aside from that consumed by frictional and form drag.

The increase in speed acquired by the fluid in passing the obstacle externally results in a corresponding decrease in pressure in accordance with Bernoulli's equation. This fact is utilized in providing lift by shaping the obstacle so that the fluid must increase its speed on the upper surface more than on the lower, thus providing circulation, which does not violate the condition of irrotational flow.

Figure 2:
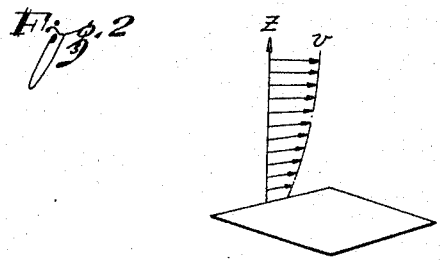
FIGURE 2 is a velocity profile of Rotational Flow, showing a slow down of the air in the neighborhood of a body, yet adjusting to the velocity of the basic stream at a great distarnce from the body.

On the other hand, when a stream approaches a solid obstacle at a supersonic speed (FIGURE 2), the reduction of the stream area caused by the presence of the obstacle necessitates a slowing down of the fluid external to the obstacle to allow an increased mass flow per unit area through the remaining passage. As conditions at a great distance to either side of the body remain those of the basic stream, the reduction in velocity must occur chiefly near the body.

There is then a positive velocity gradient as one proceeds outward along a normal to the surface, $$\frac{\partial v}{\partial z} > 0$$

This positive gradient extends far beyond the viscous boundary layer. This violates the condition for irrotationality given above, namely:

$$\frac{\partial v}{\partial z} = -\frac{v}{R} < 0$$

As vortically in an ideal fluid can exist only behind a shock wave, the conclusion is that a shock wave must inevitably occur forward of the convex portion of any surface in an otherwise unbounded supersonic stream of uniform flow.

These conditions of supersonic flow leading to shocks and dissipation are based on uniform flow, i.e., a flow of constant energy, or uniform Bernoulli constant along stream lines through the flow. The selective addition of either axial or rotational energy in certain regions would change the uniform energy conditions and the Bernoulli constant. Such a non-uniform flow permitting satisfaction of the mass flow and irrotationality conditions would eliminate the requirement for dissipative shocks. If the energy could be added in such a way as to produce thrust, there would be no net cost for this arrangement.

Either a discontinunity or its equivalent in a layer of fluid endowed with rotation may be provided in an external flow by the addition of energy to the layers of air near the body. The flow in such layers will thereby achieve a higher reservoir pressure, which means that it can have, for example, a higher velocity for the same pressure and density.

This higher velocity then will give an increased mass flow by the body, and if the energy added is sufficient, the velocity increase near the body will be sufficient to allow a negative velocity gradient towards the outer flow. The flow near the body could then be rotational or irrotational, depending on the comparative energization of different flow layers. In either case, shocks would be avodied in principle but if applied to the external flow field, it is not a completely satisfying solution for the entire problem of avoiding the sonic boom for the following reasons:

In a supersonic flow, the addition of energy by pressure propagation can be accomplished only within the Mach cone. This fact limits effect of suction to the fluid downstream, where it would be undesirable. Further, the addition of energy by suction is not confined to the fluid in the layers immediately adjacent to the body, so no surface of discontinuity would be formed. Nor would the reservoir pressure of the fluid sucked in be changed until the fluid had entered the slot. Energizing by a jet, on the other hand, would produce the required layer of increased mass flow, but this would be very difficult to do continuously at the leading edge where it is required, and would at least partly offset its benefit by adding to the mass flow to be accommodated.

Suction could be provided on the external surface sufficient to provide both the increased in mass flow and the required irrotational velocity profile. However, the suction would have to be sufficient to compensate entirely for the presence of the body to satisfy the mass flow requirements, and hence the suction requirements may be enormous. Thus, in a practical sense the external mechanism appears to be limited providing a proper velocity profile, as satisfying the mass flow requirement in order to avoid shocks through suction alone would perhaps require a prohibitive energy level.

It has been found, however, that the problem can be approached from a different point of view if one considers the possibility to render the obstacle as not "appearing" as an obstacle for the external flow. In this case the external flow near the obstacle would not have to accommodate the displaced mass, which in turn, would prevent production of a rotational flow pattern at supersonic speeds. This can be accomplished by shaping the aircraft so that all obstacle faces are in fact openings receiving the mass flow which otherwise has to be displaced. How this can be reduced to practice will be developed with reference to FIGURE 3.

It is of principal importance, that in any internal, i.e., confined flow, the entire velocity profile can be controlled. One can slow down or compress the main center flow, with the increased pressure then being sustained by the duct wall, while strong suction is maintained along the sides of the duct to have a larger velocity along these sides. The duct may then converge in section internally, permitting space for removal of the side boundary layer air to maintain the irrotational velocity profile.

Figure 3:
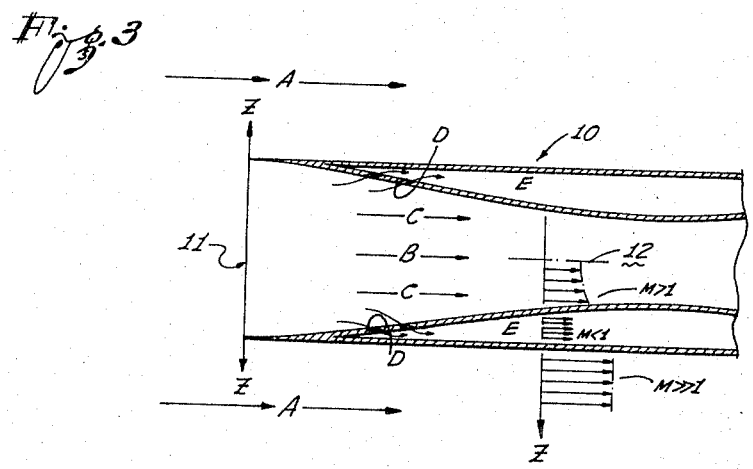
FIGURE 3 illustrates schematically internal and external flow regions of a tubular cylinder with converging interior.

Thus when a stream approaches a hollow or tubular obstacle such as 10 in FIGURE 3 at supersonic speed, the reduction of the stream area apparently caused by the presence of the obstacle as a whole necessitates measures to prevent an increased mass flow per unit area through the remaining passage (externally) to avoid development of a rotational velocity profile. The tube 10 as shown is provided with cylindrical external surfaces which extend parallel to the direction of the external flow field A, so that no flow components in the direction z are set up in flow field A. Together with other suitable shape adaptations, it is possible to obtain the required increased mass flow internally alone by slowing down the internal flow without requiring any mass flow addition in region A.

All air within the obstacle area provided by the tube actually enters orifice 11 and is not displaced into the outer region of flow A. The internal flow B and C is separated from the outer flow A by the discontinuity provided by the surface D of the duct 10. The converging wall D of duct 10 now is an obstacle only for the internal flow field B and C. However, the surface or wall D is not a complete obstacle either, but is provided with apertures, so that part of the air, particularly the slower moving boundary layer air along the wall D, may pass through and into a flow region E. If now suction is provided down stream of region E, wall D will actually slow down the flow in region C to a lesser extent, so that there now is a greater speed in region C than in central region B. The converging of the wall D provides for a slow down of all of the supersonic stream, but suction in region E effective through apertures in wall D by constant removal of the boundary layer flow along wall D causes a local pressure reduction which increases the velocity in adjacent region C. Consequently, at supersonic speeds the required increase in mass flow density is accomplished by the slowing down of the internal fluid, while the internal flow profile is being made irrotational, as the flow is not required to adjust itself to the conditions at a great distance from the body on the sides. The velocity profile across the internal flow can then be negative with respect to the duct surface D and no shocks are required. The annular flow region E increases in across section downstream as its flow field is subsonic.

Even though the requirement for shocks has thus been removed, they may still arise through instability. As in a subsonic boundary layer flow, an adverse pressure gradient is suspected of being one of the most likely causes of such an instability. For example, if through a local instability a shock were to momentarily form in the tube, the high pressure behind the shock, together with the leakage of this high pressure forward along the tube in the boundary layer near surface D, would determine a balance in pressure which would locate the shock.

In the experimental case, the shock generally moves forward (in the drawing to the left) to the mouth 11 of duct 10 or even outside of the duct, then producing quite a severe shock. This may be explained as the result of the higher static pressure in the downstream region 12 pushing the shock forward until the severity of the shock sufficiently reduces the static pressure downstream to obtain a balanced condition.

The employment of suction (for example by means of a fan) in the vicinity of surface D and particularly in the forward converging section of the duct 10 will reduce the static pressure in the boundary layer and in the adjacent flow region C. Thus, the problem of providing upstream influence near opening 11 is handled by the subsonic upstream boundary layer along surface D and in flow field E which probes far upstream. The further use of suction from the engine will likewise reduce the pressure of the center flow B when it is subsonic. Thus, should a shock wave form momentarily, the use of suction will lower the static pressure in the subsonic flow aft of the shock, thereby allowing the shock to move down stream and lessen in intensity, either moving near the throat and occuring near Mach one where very little energy would be lost, or moving past the throat and disappearing as the flow expanded. Suction thereby provides a means of controlling, locating, and minimizing the shocks.

The inner flow or center flow B compresses and slows down from supersonic to subsonic velocity due to the reduction in cross section of duct 10, and the suction at the sides maintains the velocity profile irrotational, hence shockless. The entire flow field then passes the obstacle by an internal increase in mass flow per unit cross sectional area as it slows down, and with an irrotational velocity profile, reduced down to maximum flow at sonic velocity. This compression is isentropic, there being no shocks or dissipation losses. Thus, the entire flow field can pass the obstacle by slowing down internally, as the increase in density will overcome the decrease in volocity therein, and the control of the velocity inside the obstacle will prevent the development of shocks both internally and externally. The external flow field A does not participate in the increase in mass flow, and therefore will not assume a rotational profile.

The slow down of the center flow B and the speed up of the side flow C would be superimposed, so that the speed up of the side flow is only a relative one, and the side flow C actually slows down also, but to a lesser extent than the center B, thus preserving the irrotational velocity profile within the duct 10. This air may then be continually further slowed down in toto to sonic speed in downstream region 12, diffused in the subsonic range to a desirable burning speed, and burned with fuel by an engine.

This energized flow will then be accelerated up through the speed of sound to a velocity higher than the outer flow, into which it would then discharge acting as an induction jet to externally produce an injected irrotational profile where needed.

In internal flow the compression for passing the obstacle is integrated with the compression for combustion, so that the compression losses are not wasted but instead are used, hereby providing greater overall vehicle efficiency. Thus, for non-uniform flow, energy added selectively to help the air pass the obstacle may be used efficiently in thrust.

The required conditions are better furnished internally, since the surface of discontinuity provided by the duct wall can sustain a pressure increment to allow the mass flow and irrotational conditions to be clearly met, with the surface D of discontinuity sustaining the different Bernoulli constants internally where the energy is added.

This internal flow scheme is to be applied to both the wing and the fuselage, or to any obstacle, say including the tail, and thus, in general, applies to both non-lifting items such as the fuselage and lifting items such as the wing.

With this removal of the requirement to slow down the external flow, the necessity of vorticity and shock waves external to the obstacle no longer exist. Furthermore, the loss of energy and consequent slowing down of the external boundary layer from frictional influences may be counteracted by boundary layer energization. It, therefore, becomes possible to avoid any external shock wave drag.

As one can see from FIGURES 4, 5 and 6, the aircraft has a tubular or cylindrical fuselage 20 with wing 30. FIGURE 6 is a view of the craft from the front and thus shows the maximum cross-profile of the craft which is identical with the maximum "obstacle" area apparently offered by the craft in direction $x$ (FIGURE 5), which is transverse to the plane of FIGURE 6. This area is outlined by the dash-dot line 14. Normally, air approaching an aircraft towards this obstacle area will be displaced externally by the craft if there are no openings within this line 14. The entire front of the aircraft structure designed in accordance with the present invention offers an orfice to the air flow defined by apertures and openings and having overall dimensions in all directions within parallel planes extending transversely to the direction of undisturbed air flow, which dimensions are substantially equal to the maximum dimensions and extensions of the aircraft also transversely to the direction of undisturbed air flow.

In other words, the total "aperture" area is only to a very small extent smaller than the "obstacle" area outlined by outer contour line 14. Specifically, the front portion of the fuselage 20 has a large, circular opening 21 defined by a very thin and sharp circular edge 22 from which the fuselage extends in after direction, and in form of a conventional 3-dimensional cylinder. The cylinder does not widen perpendicular to the direction $x$ of undisturbed air flow. The outer surfaces of this cylinder 20 are parallel to the free stream of air until faired in the tail section 20'. This parallel stream of air is thus not disturbed, even at the front opening or orifice 21 of the fuselage 20.

Figure 7:
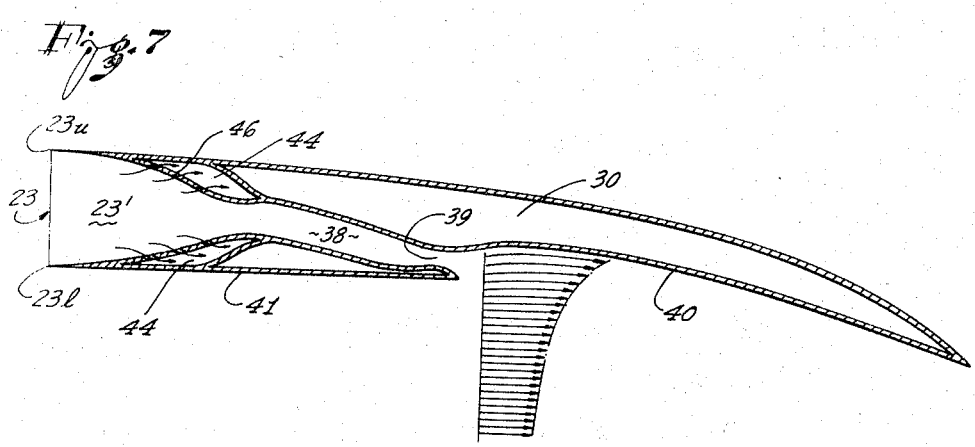
FIGURE 7 illustrates a section view of the wing of the aircraft of FIGURE 4 taken along the line 7—7 thereof, and illustrating the irrotational velocity profile provided by a jet discharge.
Figure 8:
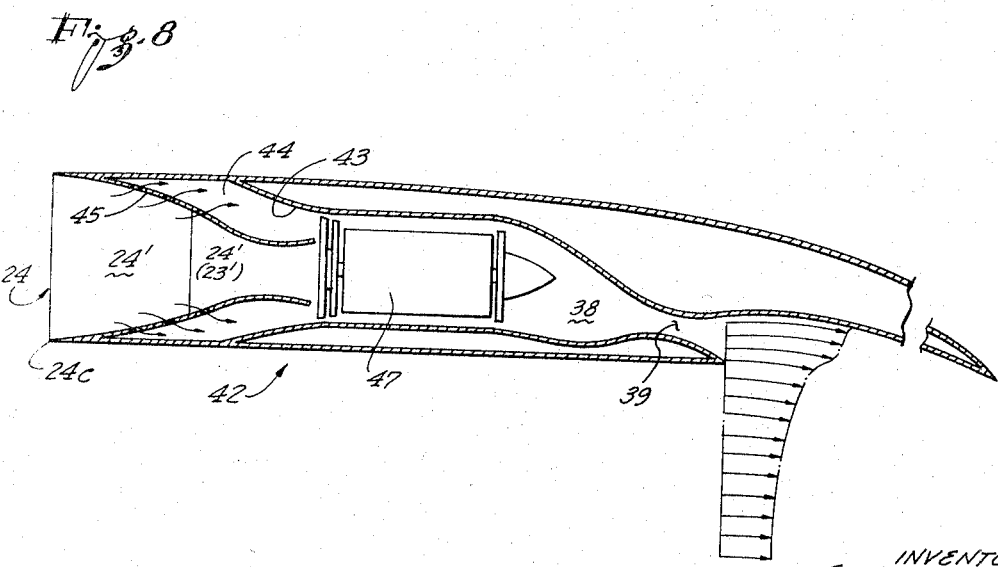
FIGURE 8 illustrates a section view of a wing engine of the aircraft of FIGURE 4 taken along the line 8—8 thereof.

Likewise, the front portion of the wing 30 has a front opening 23 defined by two sharp edges 23$u$ and 23$l$. The size of opening 23 is substantially equal to the widest thickness of the wing (FIGURE 7). A chamber 42 is provided for an auxiliary engine 47, there being at least one in each wing section. This is shown in FIGURE 8. The chamber 42 for engine 47 also has a front opening 24 defined by a circular edge 24$e$. Opening or orifice 24 offers an entrance to the oncoming flow of air that is equal to the largest width of the engine chamber 42.

From FIGURES 5, 7 and 8, one can see that seen from the front, the fuselage, wing, and wing engines have their largest dimensions at the front openings 21, 23, and 24 respectively, so that the aircraft as seen from the approaching air flow regions does not appear to offer any material obstacle other than the thin edges respectively defining the openings 21, 23, and 24. One can also see, that adjacent the openings, each such edge internally is the end of a cusp.

Describing first details of the structure of the fuselage, (FIGURES 4, 5) the front opening or entrance mouth 21 leads to a first chamber 21' defined by a duct 25 of decreasing cross section but having apertures of perforations which permit passage of air into an annular suction chamber 26. This chamber 26 is defined by the outer side of duct 25 and by a wall structure or duct 31. The chamber 26 has an increasing cross section in its upstream region. A fan 27 pertaining to the main engine 28 pulls air from chamber 21' through the apertures of duct 25 into chamber 26. Thus, suction in chamber 26 sucks away the boundary flow in chamber 21' at duct 25 so that fan 27 accelerates the flow at duct 25 and the resulting velocity profile as it extends from the inner wall of duct 25 towards the center of the flow field in chamber 21' is such, that the speed is relatively high near duct 25, but is decreasing towards the center of the flow field in chamber 21' so as to produce an irrotational flow therein.

The decreasing cross section of duct 25 forms an obstacle as far as the air entering opening 21 is concerned. This is the first material obstacle encountered by the air that has headed towards the nose of the aircraft, but now this obstacle is an internal one and does not influence the external free flow along, i.e., above and below, the fuselage. Since the air enters the mouth 21 at supersonic velocity, the velocity of the air is reduced in contracting duct 25 to handle the compression of the mass flow. The turbo fan engine 28 however adds kinetic energy primarily to the sides of this internal air flow, so that by suction through perforated duct 25 there is nowhere a rotational velocity profile in any supersonic region.

The converging duct 25 tends to overall decrease the velocity of air within the fuselage, while the fan 27 tends to speed up the air flow in the ducts. The balance achieved is such that the decrease of the air velocity in the center of the flow field in the interior of chamber 21' is greater than near duct 25 to insure the irrotational flow profile referred to above. However, suction at duct 25 "subtracts" mass from the flow field in this chamber 21' through the adjacent duct 25 so that the flow field near duct 25 achieves primarily by loss of mass through the perforations rather than by slow down. Since additionally, kinetic energy is added to the flow in the boundary layer an irrotational profile is attained indeed. The internal flow in the region remote from the obstacle-converging duct 25 is not determined by external conditions, but can and has been controlled by the fan 27 by suction through duct 25. Thus, the flow pattern within ducts 25 and 31 does not have to adapt to any external free flow conditions beyond the reach of control by the equipment of the aircraft.

The engine 28 is provided with the usual compressor 29, a duct burner 32, a primary burner 33, and a turbine 34. The air is discharged from the turbine 34 through a duct 35, and after passage through a Venturi duct 36, the air is discharged partially underneath the passenger and cargo chamber 37 and partially into a wing discharge chamber 38.

The air discharged from the nozzle or Venturi pipe 36 underneath the passenger and cargo sections 37 has a velocity at least not lower than the external air velocity so that in the vicinity of the lower portion of the fuselage and in the vicinity of the duct near the exhaust port, the air flow cannot assume a rotational profile.

On top of fuselage 20 as well as in the area underneath the engine, the flow continues unimpeded, because the air flowing towards the aircraft outside of the area given by the width of orifice 21 is not affected, and does not have to accommodate additional mass flow. The air discharged through nozzle 36 provides continuity across the fuselage of the jet discharge along the underside of the wing on either side as described in the following.

The problem of avoiding a sonic boom is somewhat more involved as far as lifting items such as the wing is concerned. FIGURE 7 illustrates a representative cross section through the wing as mentioned above. The leading edge of the wing is the "thickest" portion of the wing and offers a mouth or orifice 23 to the oncoming air of similar dimensions. A portion of the air entering chamber 23' through the leading edge-mouth 23 of the wing is passed through perforations of a duct 46 defining chamber 23'. Air passing through the perforations in wall 46 enters a suction chamber 44. The air not escaping through the perforations of duct 46 is compressed, and its velocity is reduced eventually down to sonic levels and below and passes into the wing duct 38 mentioned above and communicating with the engine discharge path. All the air in duct 38 is then passed through a Venturi type, slot-shaped nozzle 39 positioned underneath the entire span of the wing and being contiguous with the nozzle 36 underneath the passenger and cargo section 37. The air discharged from nozzle 39 passes underneath the concave portion 40 of the wing.

It is necessary for the internal flow in the wing to also assume an irrotational profile. For this purpose one or more engines such as 47 is provided along the wing. A cross section of this wing portion is shown in FIGURE 8. The region of air flow in between entrance or orifice 24 of engine 47 and the engine itself is defined by an outer duct 43 and an inner perforated duct 45 forming a compression chamber 24'. The wing engine 47 provides suction and pulls air into the chamber 44 here defined between ducts 43 and 45.

Chamber 44 thus extends along the entire wing span. In the wing proper, the chamber 44 is separated from the chamber 38 by the perforated duct 46 as stated and in the engine chamber 42, duct 45 separates suction chamber 44 from the engine entrance chamber 24'. Thus, engine 47 provides suction in chamber 44 throughout the wing. Farther downstream, chamber 24' becomes contiguous with wing chamber 23', so that the engine 47 also affects the central flow throughout the wing. In this way, the velocity profile throughout the entire interior of the wing is controlled towards an irrotational flow. The flow passing through openings 23 and 24 respectively into chambers 23' and 24' and flowing towards exit nozzle 39 has a lower speed in the center than the air adjacent ducts 45 and 46 due to suction in chamber 44 as provided by the engine 47, so that an irrotational flow profile is also insured in chambers 23' and 24' and internal shocks are avoided. The aft chamber of engine 47 communicates with the wing duct 38 to provide a common out flow towards nozzle 39.

The upper surface of the wing 30 is convexly shaped and turns down away from the flow thereby providing an expansion region on the top producing suction lift on the upper surface of the wing. The lower portion of the wing in the vicinity of the mouth 23 has a flat surface portion 41 extending aft to nozzle 39, after which the wing surface is concaved down (surface portion 40) into the flow, thereby providing an increased pressure lift on the lower surface of the wing.

The top and bottom surfaces of the engine chamber 42 are cylindrical until merging into the convex-concave profile of the wing. The nozzle 39 is of course contiguous throughout the wing span including the underneath portion of the wing engine chamber 42. The air discharged through slot or nozzle 39 has a velocity higher than the velocity of the external air flow. Thus an irrotational velocity profile is provided aft from the exit nozzle 39 underneath the curved and lift-producing portion 40. The jet leaving nozzle 39 and the external flow underneath the concave portion 40 have no mass flow conflict. The combined flow is turned downward by wing portion 40 to produce lift.

The concave turn on the underside of the wing would normally produce a shock, but since the maximum body thickness has already been "swallowed" by the internal flow, the turn does not involve any further increase in mass flow due to passing the obstacle. Hence the major contributor to shock has been avoided at and along the wing. Of course, the turn of concave wing element 40 itself has some of the aspects of a passing obstacle, and normally would give rise to a shock or slow-down, thereby providing rotational flow; however, the jet discharged through nozzle 39 provides an increased velocity directly along this curved wing portion 40 which through viscous mixing induces an irrotational velocity profile in the entire flow underneath the wing.

Normally, such an increase in velocity would be overcompensated by a decrease in density, as is the case of uniform flow of given Bernoulli constant, but with the increase in energy due to the jet, an irrotational velocity profile is provided requiring no rotation, no decrease in density, nor any shocks, yet still permitting the flow to turn thereby providing the necessary lifting pressure on the undersurface of the wing.

Looking now to the aircraft as a whole, the description of the illustrations given above shows that the aircraft directly offers to the oncoming flow of air only openings into which all the air enters which would flow through the area equal to the maximum cross-sectional profile of the aircraft (obstacle area 14), if there were no aircraft. This air is thus not being displaced and is not added to the external flow around the fuselage and wings. The external flow along the aircraft is, therefore, not disturbed by having to accommodate additional mass flow. Substantially, all of this air, which in the absence of the craft would flow through area 14, enters the aircraft, and in the interior of the aircraft an irrotational flow profile is imparted upon the internally flowing air by the addition of energy even though this air stream is forced to slow down to subsonic velocities to accommodate the mass flow. This holds true throughout the interior of the craft.

The exterior of the fuselage itself offers only parallel surfaces and surfaces of decreasing cross section in the aft portion of the tail. The wing is largest in thickness in the front and has a convex upper surface. The down turn of the concave aft portion of the wing where dipping into the flow and appearing as an obstacle has along its concave underside portion an additional jet air flow having a velocity larger than that of the external undisturbed flow, thereby inducing this external air to flow faster, so that even under the curved obstacle providing portion an irrotational profile is being imparted upon the flow in the vicinity of the wing.

It can be seen that any tail portion of the aircraft if required could be provided with similarly designed features offering a wide aperture with a following contracting duct to the oncoming flow of air, and by means of an aft auxiliary engine an irrotational profile can be induced in the interior of this aft duct. As can be seen further from the drawings, wings and fuselage are both jointly and individually provided with means to prevent the setting up of rotational flow profiles along their respective outer boundaries, and they individually and jointly set up internal, irrotational flow profiles. Each of these provisions eliminates a portion of the causes of the sonic boom, so that even either one of these features for wing and fuselage design considered by themselves are capable of reducing the production of shock, thereby reducing the amount of energy that is dissipated.

Figure 9:
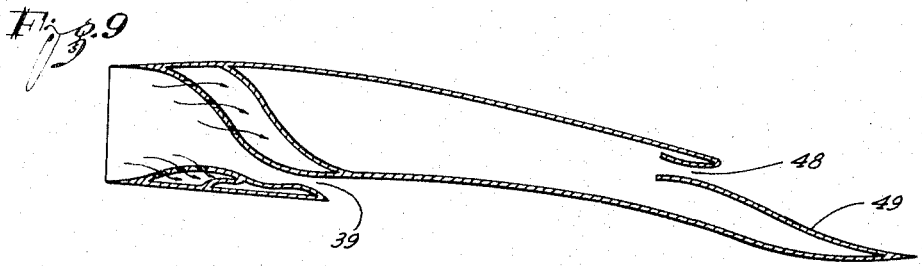
FIGURE 9 illustrates a section view through a modified wing structure.

The wing profile structure shown in FIGURE 9 illustrates that alternatively the configuration of the trailing edge of the wing can be improved to further minimize the development of any shock at the trailing edge. The upper surface here is provided with a cusp, and upstream of the cusp there is another wing nozzle 48 for discharging a high speed jet to provide irrotational flow in the outer stream at the curved wing portion 49. The lower wing surface near the trailing edge is reflexed so that the trailing edge proper has the direction of the free flow. Thus, the trailing edge is completely embedded in induced high speed jet flows of irrotational profile above and below.

The invention is not limited to the embodiments described above, but all changes and modifications thereof not constituting departures from the spirit and scope of the invention are intended to be covered by the following claims.

What is claimed is:

1. An aircraft to operate at supersonic speeds, said aircraft comprising a wing and a fuselage, said fuselage having a nose and tail and an exterior substantially parallel to the free stream of air flow beginning at said nose and maintaining a substantially uniform cross section and being further provided with a faired closure at its tail, said fuselage having an aperture at its nose bounded by said exterior surfaces, said wing having leading and trailing edges and having upper and lower surfaces, said wing having an aperture along its leading edge bounded by said upper and lower surfaces, said upper wing surface being convex as to provide upper surface suction lift, said lower surface being substantially parallel to the free stream air flow adjacent said leading edge, there being a jet opening at said lower surface upstream from said trailing edge, said lower surface being concave downstream from said opening to the trailing edge closure, said fuselage and said wing respectively having duct means of contracting cross sections, there being energizing means in said fuselage and wings to pull in the air entering said apertures and to maintain an irrotational velocity profile in said duct means to minimize shock dissipation, there being additional means to exhaust said air after being energized by said energizing means along said concave surface of said wing to provide lower surface pressure lift.

2. In an aircraft for operation at supersonic speeds, the combination comprising:
   a substantially tubular fuselage having a front aperture the cross section of which being substantially similar to the largest cross dimensions of said fuselage, said fuselage being faired into a closed aft juncture;
   an internal duct in said fuselage following said front aperture and having decreasing cross sections from said front aperture;
   energizing means positioned downstream in said duct to induce a suction flow in said duct having a larger velocity adjacent a boundary layer at the duct than in the center portion of said duct;
   and nozzle means to discharge the air having entered said duct, along a surface portion of said aircraft to increase the velocity of air adjacent said surface portions above the velocity of the free air flow relative to said aircraft.

3. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize the air entering said aperture and propel it out along the underside of said aircraft.

4. In an aircraft for operation at supersonic speeds, a wing having upper and lower leading edges defining an opening, and having a trailing edge, said wing further having a convex upper surface, a flat lower surface portion adjacent the lower leading edge of the wing, a concave surface portion adjacent the trailing edge of the wing, and a nozzle in between said flat and said curved surface portions, said nozzle being directed towards and along said curved surface portion, said aperture as defined by said leading edges of the wing having dimensions substantially equal to the largest cross sectional profile of the wing.

5. In an aircraft for operation at supersonic speeds, a wing having upper and lower leading edges defining an opening and having a trailing edge, further having a convex upper surface portion, and a lower concave surface portion, a nozzle in said lower surface portion, said nozzle being directed towards and along said curved surface portion, and an engine with fan in the wing for providing air to said nozzle for discharge through said nozzle at a velocity in excess of the velocity of the free flow of air along the aircraft.

6. In an aircraft for operation at supersonic speeds, said aircraft comprising a wing and a fuselage, said fuselage having its largest cross section adjacent the front end, there being an opening in said front end of similar dimensions;
- a perforated duct contiguous with said front end and defining a chamber of decreasing cross section for air entering said duct through said opening;
- fan means for providing suction through the perforations of said duct thereby providing an irrotational velocity profile in said duct by inducing a larger air velocity along said duct than in the interior of the chamber as defined by said duct; and
- nozzle means to discharge the air having entered said duct along a portion of the surface of that aircraft to exteriorly induce an irrotational velocity profile at an outer surface portion of said aircraft.

7. In an aircraft for operation at supersonic speeds, said aircraft including a wing said wing having upper and lower leading edges defining an opening, further a trailing edge and convexly and concavely curved surface portions, said wing further having its largest cross-sectional dimension adjacent its leading edges, the opening defined by said leading edges offering a cross-sectional area substantially similar to said wing cross-sectional dimension;
- a perforated duct contiguous with said opening and having a decreasing cross section and defining a compression chamber;
- means in said wing defining a second chamber communicating with said duct through the perforations thereof;
- an engine in said wing driving a fan for pulling air into said second chamber with the velocity of air in said compression chamber being larger along said duct than in the interior of said compression chamber;
- and nozzle means for discharging said air having entered said opening along at least one of said concavely curved wing surface portions.

8. An aircraft having a fuselage with a nose and having a wing having leading edges defining an aperture having a cross sectional profile substantially similar to the largest cross sectional profile of said wing, said wing further having a trailing edge, said fuselage having its largest cross section area adjacent said nose;
- means including said nose defining an aperture in said fuselage having a cross section substantially similar to said largest fuselage cross section area;
- duct means adjacent said aperture defining means having contracting cross section;
- engine and fan means in said duct to impart an irrotational velocity profile upon the air entering said duct and through said apertures in the fuselage;
- engine and fan means in said wing adjacent said wing apertures for pulling air into the duct of said wing and to impart upon such air flow an irrotational velocity profile; and
- jet nozzle means to discharge at least some of the air from either of said engine means underneath said wing between leading and trailing edges and at a velocity higher than the air velocity of the flow along said aircraft.

9. An aircraft body component for use in an aircraft, said aircraft having concavely shaped surface portions, said component having front and rear ends, with the front end destined to face oncoming air flow, said component having maximum size dimensions at said front end measured transversely to the diretion of said air flow;
means defining an opening at said front end and having similar dimensions as said maximum size dimensions;
duct means in said component adjacent to and contiguous with said opening and having a contracting cross section in downstream direction;
energizing means for pulling air into said duct means through said opening and imparting upon said air an irrotational velocity profile within said duct;
and nozzle means to discharge said air along said concavely shaped surface portions of the aircraft.

10. An aircraft to fly at supersonic speeds, said aircraft comprising
- a wing, said wing having
  - a forward facing aperture substantially corresponding to the maximum cross section of said wing;
  - an upper surface whose leading edge segment is substantially oriented in the direction of flight, and which curves convex down thereafter away from the flow;
  - a lower surface whose leading edge segment is also substantially oriented in the direction of flight, and containing aft thereof a jet nozzle for emitting a jet of fluid aft along said lower surface, which thereafter curves concave down into the flow;
  - a sharp trailing edge forming a closed juncture of said upper and said lower surfaces;
  - energizing means to energize the air entering said aperture and propel it through said jet nozzle along the underside of said wing;
  - duct means to conduct the air entering said aperture to said energizing means;
  - flow control means to selectively energize said air in said duct to a greater degree along the inner sides thereof to maintain an irrotational velocity profile of said air in slowing down to sonic speed to enter the said energizing element, said flow control means comprising a double wall duct, having an outer wall and an inner wall, said inner duct wall containing slots, wherein the boundary layer air along said inner duct wall is pulled in through said slots into the chamber between said duct walls, whereby such air in said chamber comprises substantially subsonic flow, said energizing means providing in said chamber upstream substantially all the way to the aperture, a reduction in pressure thereby providing a removal of a portion of the mass flow and a consequent speed up of the remainder of air flow along the sides of the main inner flow, thus providing therein an irrotational velocity profile;
- and a fuselage, said fuselage having
  - a forward facing aperture substantially corresponding to the maximum cross section of said fuselage;
  - a substantially constant cross section, with surfaces oriented in the direction at flight;
  - a faired and closed aft end;
  - energizing means to energize the air entering said aperture and propel it aft out a jet nozzle on the underside of said fuselage and adjacent wing;
  - duct means to conduct the air entering said aperture to said energizing means;
  - flow control means to selectively energize said air in said duct to a greater degree along the inner sides thereof to maintain an irrotational velocity profile of said air in slowing down to sonic speed to enter the energizing element, said flow control means comprising a double wall duct, having an outer wall and an inner wall, said inner duct wall containing slots, wherein the boundary layer air along said inner duct wall is pulled in through said slots into the chamber between said duct walls, whereby such air in said chamber comprises substantially subsonic flow, said energizing means providing in said chamber upstream substantially all the way to the aperture, a reduction in pressure thereby providing a removal of a portion of the mass flow and a consequent speed up of the remainder of the air flow along the sides of the main inner flow, thus providing therein an irrotational velocity profile.

11. An aircraft to fly at supersonic speeds, said aircraft comprising
   a wing, said wing having
      a forward facing aperture substantially corresponding to the maximum cross section of said wing;
      an upper surface whose leading edge segment is substantially oriented in a direction of flight, and which curves convex down thereafter away from the flow;
      a lower surface whose leading edge segment is also substantially oriented in the direction of flight, and containing aft there a jet nozzle for emitting a jet of fluid aft along said lower surface, which thereafter curves concave down into the flow;
   a fuselage, said fuselage having
      a forward facing aperture substantially corresponding to the maximum cross section of said fuselage;
      a substantially constant cross section, with surfaces oriented in the direction of flight;
      a faired and closed aft end;
   energizing means to energize the air entering said aperture of both said wing and said fuselage and propel it aft of said jet nozzle on the underside of said aircraft;
   duct means to conduct the air entering said aperture of both said wing and said fuselage to said energizing means; and
   flow control means to selectively energize said air in said duct to a greater degree along the inner sides thereof to maintain an irrotational velocity profile of said air in slowing down to sonic speed to enter the energizing element.

12. An aircraft to fly at supersonic speeds, said aircraft comprising:
   a forward facing aperture substantially corresponding to the maximum cross section of said aircraft;
   an upper surface of substantially all of the spanwise extent of said aircraft having a leading edge segment substantially oriented in the direction of flight, and which curves convex down thereafter away from the flow;
   a lower surface of substantially all of the spanwise extent of said aircraft having a leading edge segment substantially oriented in the direction of flight, and containing aft thereof a jet nozzle for emitting a jet of fluid aft along said lower surface, which thereafter curves concave down into the flow;
   energizing means to energize the air entering said aperture and propel it aft out said jet nozzle along the underside of said aircraft;
   duct means to conduct the air entering said aperture to said energizing means; and
   flow control means to selectively energize said air in said duct to a greater degree along the inner sides thereof to maintain an irrotational velocity profile of said air in slowing down to sonic speed to enter the energizing element.

13. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize a portion of the air entering said aperture and propel it out along the underside of said aircraft.

14. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize the air entering said aperture and propel a portion of said air out along the underside of said aircraft.

15. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize a portion of the air entering said aperture and propel said portion out along the underside of said aircraft.

16. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize the air entering said aperture and propel it out alongside said aircraft.

17. An aircraft to fly at supersonic speeds, said aircraft comprising:
   means defining a forward facing aperture substantially corresponding to the maximum cross section of said aircraft;
   an upper surface the majority of which curves convex down away from the flow;
   a lower surface the majority of which curves concave down into the flow; and
   energizing means to energize a portion of the air entering said aperture and propel said portion out alongside said aircraft.

18. An aircraft to fly at supersonic speeds, said aircraft comprising:
   means defining a forward facing aperture substantially corresponding to the maximum cross section area of said aircraft;
   an upper surface the majority of which curves convex down away from the flow; and
   energizing means to energize a portion of the air entering said aperture and propel said portion out alongside said aircraft.

19. An aircraft to fly at supersonic speeds, said aircraft comprising:
   means defining a forward facing aperture substantially corresponding to the maximum cross section of said aircraft;
   a lower surface the majority of which curves concave down into the flow; and
   energizing means to energize a portion of the air entering said aperture and propel said portion out alongside said aircraft.

20. An aircraft to fly at supersonic speeds, said aircraft comprising:
   a lower surface element which curves concave down into the flow;
   energizing means to energize air; and
   a converging-diverging nozzle forward of and contiguous with said lower surface element disposed to emit said energized air in a jet along said lower surface element with a supersonic velocity greater than that of said aircraft.

21. An aircraft wing to fly at supersonic speeds, said wing comprising:
   a lower surface element which curves concave down into the flow;
   energizing means to energize air; and
   a converging-diverging nozzle forward of and contiguous with said lower surface element disposed to emit said energized air in a jet along said lower surface element with a supersonic velocity greater than that of said wing.

22. An aircraft wing to fly at supersonic speeds, said wing comprising:
   a lower surface element which curves concave down into the flow;
   energizing means to energize air; and
   a converging-diverging nozzle to emit said energized air in a supersonic jet alongside said lower surface element disposed aft thereof.

23. An aircraft wing to fly at supersonic speeds, said wing comprising:
   a lower surface element which curves concave down into the flow; and
   a converging-diverging nozzle to emit a supersonic jet of fluid along the underside of said lower surface element.

References Cited by the Examiner
UNITED STATES PATENTS

| | | | |
|---|---|---|---|
| 1,877,474 | 9/1932 | Burkhart | 244—12 |
| 2,584,198 | 2/1952 | Griffith | 244—35 X |
| 2,589,945 | 3/1952 | Leduc | 244—73 X |
| 2,811,828 | 11/1957 | McLafferty | 60—35.6 |
| 2,873,931 | 2/1959 | Fleischmann | 244—42 |
| 2,916,230 | 12/1959 | Nial | 244—35 X |
| 2,951,660 | 9/1960 | Giliberty | 244—23 |
| 3,172,620 | 3/1965 | Darby | 244—42 |

MILTON BUCHLER, *Primary Examiner.*

T. MAJOR, *Assistant Examiner.*